US011050834B1

(12) United States Patent
Therani et al.

(10) Patent No.: US 11,050,834 B1
(45) Date of Patent: Jun. 29, 2021

(54) METHOD FOR AUTOMATICALLY ASSIGNING VISITS TO PARTIALLY OBSERVABLE LOCATION DATA STREAMS

(71) Applicant: Near Pte. Ltd., Singapore (SG)

(72) Inventors: Madhusudan Therani, San Jose, CA (US); Shobhit Shukla, Bangalore (IN)

(73) Assignee: Near Pte. Ltd., Singapore (SG)

( * ) Notice: Subject to any disclaimer, the term of this patent is extended or adjusted under 35 U.S.C. 154(b) by 0 days.

(21) Appl. No.: 17/106,094

(22) Filed: Nov. 28, 2020

(51) Int. Cl.
*G06F 15/16* (2006.01)
*H04L 29/08* (2006.01)
*H04L 29/06* (2006.01)

(52) U.S. Cl.
CPC .............. *H04L 67/18* (2013.01); *H04L 65/60* (2013.01)

(58) Field of Classification Search
CPC ................................ H04L 65/60; H04L 67/18
USPC ........................................................ 709/219
See application file for complete search history.

(56) References Cited

U.S. PATENT DOCUMENTS

| 8,081,657 | B2* | 12/2011 | Oz .................... | H04L 29/08657 370/468 |
| 8,489,707 | B2* | 7/2013 | Payne .................. | G08B 25/085 709/219 |
| 8,713,193 | B1* | 4/2014 | Breau ................. | H04L 65/4092 709/231 |
| 10,057,651 | B1* | 8/2018 | Singh ................. | H04N 21/4623 |
| 2003/0179780 | A1* | 9/2003 | Walker ................. | H04J 3/0664 370/508 |
| 2009/0177758 | A1* | 7/2009 | Banger .............. | G06Q 30/0253 709/219 |
| 2009/0287837 | A1* | 11/2009 | Felsher ................... | G06Q 10/10 709/229 |
| 2010/0325196 | A1* | 12/2010 | Beckman .......... | G06F 16/24568 709/203 |
| 2011/0013709 | A1* | 1/2011 | Lu ........................... | H04L 65/60 375/260 |
| 2014/0129942 | A1* | 5/2014 | Rathod ............ | H04N 21/44222 715/720 |
| 2014/0304374 | A1* | 10/2014 | McCue ............... | H04L 65/4092 709/219 |
| 2015/0149297 | A1* | 5/2015 | Mahadevan ............ | H04L 65/00 705/14.66 |
| 2015/0271229 | A1* | 9/2015 | Bullotta .................. | H04L 65/60 709/219 |
| 2016/0036894 | A1* | 2/2016 | Collins ............... | H04L 63/0428 709/201 |

(Continued)

*Primary Examiner* — Razu A Miah

(57) ABSTRACT

A system and method for automatically assigning visits to partially observable location data streams to maintain a geo-spatial model of a real world are provided. The method includes identifying a subset of a plurality of data streams that have a power-law characteristic in a time dimension or spatial dimension associated with the activity of the plurality of entities, modelling an activity of the plurality of entities to determine a region of uncertainty, obtaining a filtered activity of the entities, clustering the time dimension and the spatial dimension of the filtered activity using a stay points clustering method to generate at least one valid data stream, generating a confidence score for the at least one valid data stream, and assigning a visit of the plurality of entities to a point of interest (POI) based on the confidence score of the at least one valid data stream.

17 Claims, 6 Drawing Sheets

(56) References Cited

U.S. PATENT DOCUMENTS

| | | | |
|---|---|---|---|
| 2016/0381110 A1* | 12/2016 | Barnett | H04L 65/601 |
| | | | 709/231 |
| 2017/0212894 A1* | 7/2017 | Feng | G06F 16/29 |
| 2017/0264719 A1* | 9/2017 | Koramutla | H04L 43/106 |
| 2017/0301043 A1* | 10/2017 | Soli | G06Q 30/00 |

* cited by examiner

METHOD FOR AUTOMATICALLY ASSIGNING VISITS TO PARTIALLY OBSERVABLE LOCATION DATA STREAMS

BACKGROUND

Technical Field

The embodiments herein relate to assigning visits to data streams, and more specifically to an automatic system and method for assigning visits to location data streams for maintaining a geo-spatial model in a real world.

Description of the Related Art

With an increase in a use of smart mobile applications, users are generating a large amount of internet traffic data. The internet traffic data may be an indicative of user's location at a given time frame. Furthermore, it is important to know both online and offline data related to user's location for tracking a journey of a user to provide personalized recommendations to the user. Though, digital journeys can be mapped out well, mapping an offline journey, and physical world journeys of the user are difficult. A recent availability of location data streams from user activities promises to change a status quo. However, a quality of location data received in the location data streams is highly noisy with a major possibility for errors. The mobile applications may also spoof location histories by providing false data. The location data streams may also be affected by a device or sensor that is recognizing an event location. Data representations and spatial-temporal resolutions may vary across the ecosystem for different sources. Processing the location data streams from the different sources may lead to different conclusions about the user with respect to a user location, a duration of stay of the user in a particular location, a next location that the user went and a distance to travel to the next location on an average.

In recent times, available user data is more advanced and greater in size than ever before. However, having a better understanding of the user's location remains essential for meaningful assignment of the user's location in a geospatial model. As known, smart phones are emerging as an attractive option for large-scale sensing of human behaviors. Modern smart phones are equipped with a variety of sensors such as global positioning system (GPS) sensor, accelerometers, Wi-Fi sensor and Bluetooth sensor. Furthermore, in the recent times mobile phones have become an irreplaceable part of a human life. For instance, in many countries across the world, a number of mobile phones accounts is larger than inhabitants. Therefore, a use of the location data streams and data provided from smart phone sensors, instead of using custom made sensor architectures, is a viable option to identify the human behaviors. Available data points on human activity are increasing in size as the users use a number of devices (smartphone, smart watches, television (TV), personal computer (PC)). The number of devices may include multiple applications that may generate multiple data streams. Hence, there is a need for scalable solution that can make a decision about a validity of the data fast enough to handle a large volume of incoming location data streams, as a flow of the data is increasing and the data obtained from the location data streams is contextually relevant only for a short time period.

Accordingly, there remains a need to address the aforementioned technical drawbacks in existing technologies in assigning visits to data streams.

SUMMARY

In view of the foregoing, an embodiment herein provides a method for automatically assigning visits to partially observable location data streams for maintaining a geo-spatial model in the real world for determining engagement of a campaign in offline attribution. The method includes (a) obtaining, in real time, a plurality of data streams with at least one identifier from independently controlled sources, the plurality of data streams includes a timestamp data and a location indexed data that partially characterizes an activity of a plurality of entities associated with the at least one identifier, (b) identifying a subset of the plurality of data streams that have a power-law characteristic in at least one of a time dimension or a spatial dimension associated with the activity of the plurality of entities from each of the plurality of data streams based on the power-law characteristic, (c) modelling the activity of the plurality of entities to determine a threshold for a region of uncertainty using the at least one identifier, the region of uncertainty is determined as a time range for the time dimension and as a geographical boundary for the spatial dimension, (d) filtering the plurality of data streams to obtain a filtered activity of the plurality of entities when either the time dimension and the spatial dimension overlap in the region of uncertainty using the threshold, (e) generating at least one valid data stream by clustering the time dimension and the spatial dimension of the filtered activity using a stay points clustering method, (f) generating a confidence score for the at least one valid data stream based on a plurality of contexts associated with the plurality of entities using a linear scoring model, the plurality of contexts include a travel history of the plurality of entities, a set of point of interest of the plurality of entities and a source of the at least one valid stream, and (h) assigning a visit of the plurality of entities to a point of interest (POI) based on the confidence score of the at least one valid data stream.

In some embodiments, the visit of the plurality of entities to the POI is used to perform at least one of a POI profiling, generating an entity visit history, offline attribution, or, geo-fencing.

In some embodiments, the method further includes validating the entity visit history that includes a plurality of visits by updating the plurality of visits upon determining a new visit of the plurality of entities to the POI is observed using the at least one valid data stream.

In some embodiments, the method further includes validating the plurality of data streams by comparing at least one of an advertisement identifier, a cookie identifier or a social media identifier with previously observed identifiers.

In some embodiments, the method further includes improving a quality of assigning the visit to the POI by changing the threshold for the region of uncertainty.

In some embodiments, the method further includes validating the plurality of data streams based on a privacy compliance of an application associated with the plurality of data streams.

In some embodiments, the method further includes identifying an anomaly in the entity visit history on a periodic basis by validating the plurality of data streams with a historical data associated with the at least one identifier associated with the plurality of entities.

In some embodiments, the method further includes performing a plurality of iterations for filtering the plurality of data streams to generate the at least one valid data stream. The plurality of iterations may be performed either when the plurality of data streams is obtained after a predetermined time delay or the plurality of data streams signal a conflict of the visit in the entity visit history.

In some embodiments, generating the confidence score further includes assigning a weight to at least one of a time of the activity, an entity associated with the activity or a location of the activity.

In another aspect, there is provided a system for automatically assigning visits to partially observable location data streams to maintain a geo-spatial model of the real world for determining engagement of a campaign in offline attribution. The system includes a processor and a memory that stores a set of instructions, which when executed by the processor, causes to perform: (a) obtaining, in real time, a plurality of data streams with at least one identifier from independently controlled sources, the plurality of data streams includes a timestamp data and a location indexed data that partially characterizes an activity of a plurality of entities associated with the at least one identifier, (b) identifying a subset of the plurality of data streams that have a power-law characteristic in at least one of a time dimension or a spatial dimension associated with the activity of the plurality of entities from each of the plurality of data streams based on the power-law characteristic, (c) modelling the activity of the plurality of entities to determine a threshold for a region of uncertainty using the at least one identifier, the region of uncertainty is determined as a time range for the time dimension and as a geographical boundary for the spatial dimension, (d) filtering the plurality of data streams to obtain a filtered activity of the plurality of entities when either the time dimension and the spatial dimension overlap in the region of uncertainty using the threshold, (e) generating at least one valid data stream by clustering the time dimension and the spatial dimension of the filtered activity using a stay points clustering method, (f) generating a confidence score for the at least one valid data stream based on a plurality of contexts associated with the plurality of entities using a linear scoring model, the plurality of contexts include a travel history of the plurality of entities, a set of point of interest of the plurality of entities and a source of the at least one valid stream, and (h) assigning a visit of the plurality of entities to a point of interest (POI) based on the confidence score of the at least one valid data stream.

In some embodiments, the visit of the plurality of entities to the POI is used to perform at least one of a POI profiling, generating an entity visit history, offline attribution, or, geo-fencing.

In some embodiments, the processor further validates the entity visit history that includes a plurality of visits by updating the plurality of visits when a new visit of the plurality of entities to the POI is observed using the at least one valid data stream.

In some embodiments, the processor further validates the plurality of data streams by comparing at least one of an advertisement identifier, a cookie identifier or a social media identifier with previously observed identifiers.

In some embodiments, the processor further improves a quality of assigning the visit to the POI by changing the threshold for the region of uncertainty.

In some embodiments, the processor further validates the plurality of data streams based on a privacy compliance of an application associated with the plurality of data streams.

In some embodiments, the processor further identifies an anomaly in the entity visit history on a periodic basis by validating the plurality of data streams with a historical data associated with the at least one identifier associated with the plurality of entities.

In some embodiments, the processor further performs a plurality of iterations for filtering the plurality of data streams to generate the at least one valid data stream. The plurality of iterations may be performed either when the plurality of data streams is obtained after a predetermined time delay or the plurality of data streams signal a conflict of the visit in the entity visit history.

In some embodiments, generating the confidence score further includes assigning a weight to at least one of a time of the activity, an entity associated with the activity or a location of the activity.

In another aspect, there is provided one or more non-transitory computer-readable storage mediums storing the one or more sequences of instructions, which when executed by the one or more processors, causes to automatically perform assigning visits to partially observable location data streams by (a) obtaining, in real time, a plurality of data streams with at least one identifier from independently controlled sources, the plurality of data streams includes a timestamp data and a location indexed data that partially characterizes an activity of a plurality of entities associated with the at least one identifier, (b) identifying a subset of the plurality of data streams that have a power-law characteristic in at least one of a time dimension or a spatial dimension associated with the activity of the plurality of entities from each of the plurality of data streams based on the power-law characteristic, (c) modelling the activity of the plurality of entities to determine a threshold for a region of uncertainty using the at least one identifier, the region of uncertainty is determined as a time range for the time dimension and as a geographical boundary for the spatial dimension, (d) filtering the plurality of data streams to obtain a filtered activity of the plurality of entities when either the time dimension and the spatial dimension overlap in the region of uncertainty using the threshold, (e) generating at least one valid data stream by clustering the time dimension and the spatial dimension of the filtered activity using a stay points clustering method, (f) generating a confidence score for the at least one valid data stream based on a plurality of contexts associated with the plurality of entities using a linear scoring model, the plurality of contexts include a travel history of the plurality of entities, a set of point of interest of the plurality of entities and a source of the at least one valid stream, and (h) assigning a visit of the plurality of entities to a point of interest (POI) based on the confidence score of the at least one valid data stream.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
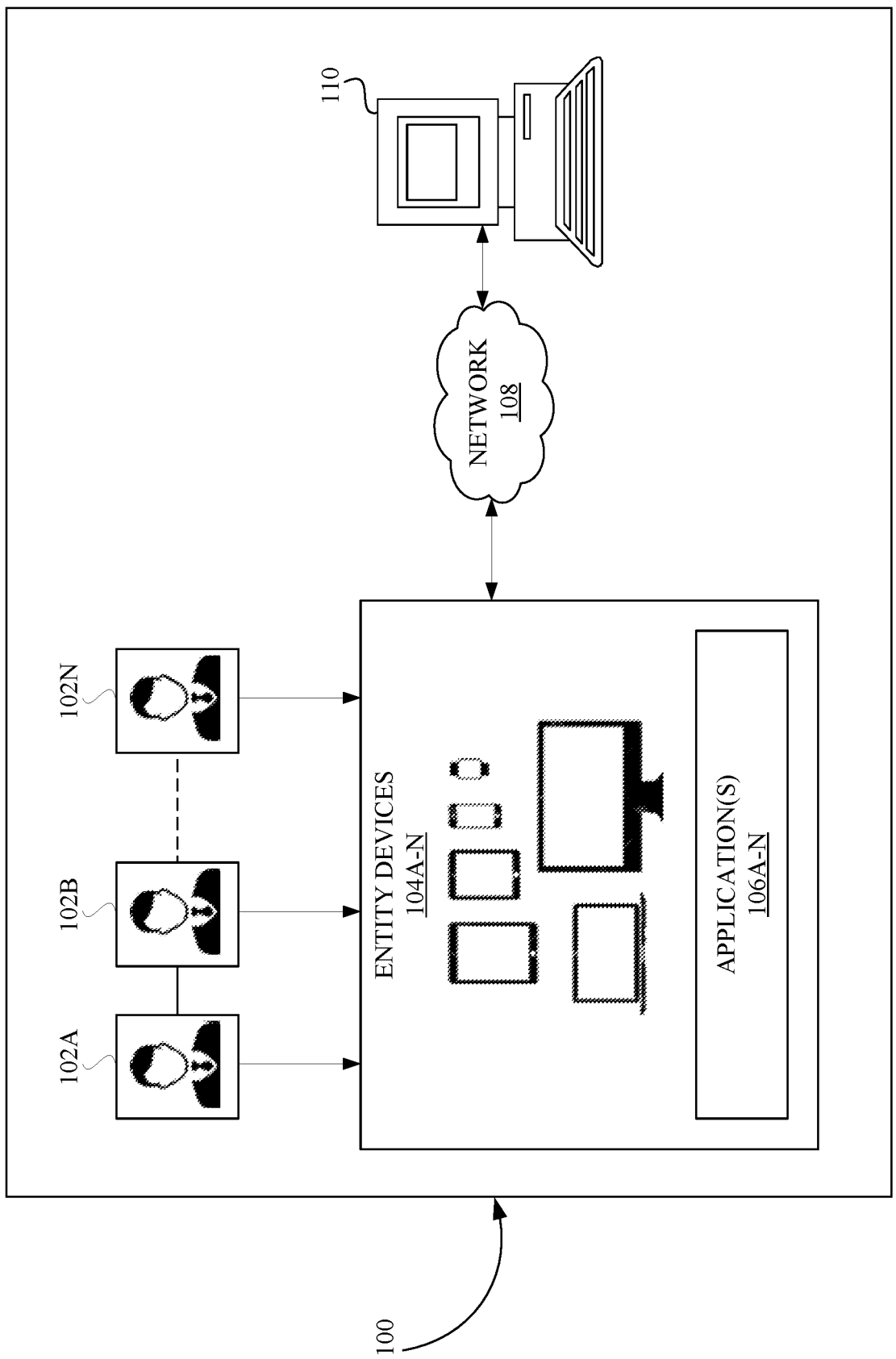
FIG. 1 is a schematic illustration of an adaptive visit assignment system for automatically assigning visits to partially observable location data streams to maintain a geospatial model in a real world according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There remains a need for a system and method for assigning visits to partially observable location data streams, and more specifically to an automatic system and method for assigning visits to location data streams for maintaining a geo-spatial model in a real world. Referring now to the drawings, and more particularly to FIGS. 1 to 5, where similar reference characters denote corresponding features consistently throughout the figures, there are shown preferred embodiments.

The term "independently controlled data sources" refers to any source that may control or standardize different aspects of data streams. The different aspects include, but is not limited to, 1) a type of data that needs to be collected, 2) a time and location, the data needs to be collected, 3) a data collection method, 4) modification of collected data, 5) a portion of data to be revealed to public, 6) a portion of the data to be protected, 7) a portion of the data can be permitted by a consumer or user of an application or a device, and 8) a portion of data to be completely private. The terms "consumer" and "user" may be used interchangeably and refer to an entity associated with a network device or entity device that includes, but is not limited to, a mobile device, a smart phone, a smart watch, notebook, a Global Positioning System (GPS) device, a tablet, a desktop computer, a laptop or any network enabled device that generates location data streams.

A single real-world event may be tracked by different independently controlled data sources. Alternatively, data from the different independently controlled data sources may be interleaved to understand an event or a sequence of events. For example, consider the consumer using multiple applications on his smart phone, as he or she interacts with each application, multiple independent data streams of events may be produced. Since, each application becomes an independent data source. Events and users may have different identifiers across different applications depending on how the application is implemented. Additionally, if one were to monitor a network, each application-level event may generate additional lower-level network events.

The term "partial observable data or partial data" refers to a data stream where all the events are not captured due to several reasons. The terms "location" and "place" may be used inter-changeably and refer to a geographic location such as a locality, a sub locality, an establishment, a geocode or an address.

In an exemplary embodiment, various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing at least one of digital signals or analog signals for performing various functions as described herein.

FIG. 1 is a schematic illustration of an adaptive visit assignment system 100 for automatically assigning visits to partially observable location data streams according to some embodiments herein. The adaptive visit assignment system 100 includes one or more entity devices 104A-N associated with one or more entities 102A-N, and an adaptive visit assignment server 110. The one or more entity devices 104A-N includes one or more applications 106A-N. The one or more entity devices 104A-N is communicatively connected to the adaptive visit assignment server 110 through a network 108. In some embodiments, the one or more entities 102A-N are a set of individuals whose activity on the one or more entity devices 104A-N generate location data streams that may be used for automatically assigning the visits to the location data streams to maintain a geo-spatial model of a real world. The visits of the location data streams may be used for determining an engagement of the one or more entities 102A-N in a campaign or offline attribution of a visit of the one or more entities 102A-N to a place of interest. The set of individuals may be a consumer or a user. In some embodiments, the one or more entity devices 104A-N include, but not limited to, a mobile device, a smart phone, a smart watch, a notebook, a Global Positioning System (GPS) device, a tablet, a desktop computer, a laptop or any network enabled device that generates the location data streams. In some embodiments, the one or more entity devices 104A-N may run the one or more applications 106A-N that are responsible to generate the location data streams. In some embodiments, the network 108 is at least one of a wired network, a wireless network, a combination of the wired network and the wireless network or the Internet. The adaptive visit assignment server 110 obtains, in real time, a plurality of data streams with at least one identifier from independently controlled source. The plurality of data streams includes a timestamp data and a location indexed data that partially characterizes an activity of the one or more entities 102A-N associated with the at least one identifier. The adaptive visit assignment server 110 identifies a subset of the plurality of data streams that have a power-law characteristic in at least one of a time dimension or a spatial dimension associated with the activity of the one or more entities 102A-N from each of the plurality of data streams based on the power-law characteristic. The adaptive visit assignment server 110 models the activity of the one or more entities 102A-N to determine a threshold for a region of uncertainty using the at least one identifier. The region of uncertainty is determined as a time range for the time dimension and as a geographical boundary for the spatial dimension. The adaptive visit assignment server 110 filters the plurality of data streams to obtain a filtered activity of the one or more entities 102A-N when either the time dimension and the spatial dimension overlap in the region of uncertainty using the threshold. The adaptive visit assignment server 110 generates at least one valid data stream by clustering the time dimension and the spatial dimension of the filtered activity using a stay points clustering method. The adaptive visit assignment server 110 generates a confidence score for the at least one valid data stream based on a plurality of contexts associated with the one or more entities 102A-N using a linear scoring model. The plurality of contexts includes a travel history of the one or more entities 102A-N, a set of point of interest of the one or more entities 102A-N and a source of the at least one valid stream. The adaptive visit assignment server 110 assigns a visit of the one or more entities 102A-N to a point of interest (POI) based on the confidence score of the at least one valid data stream.

Figure 2:
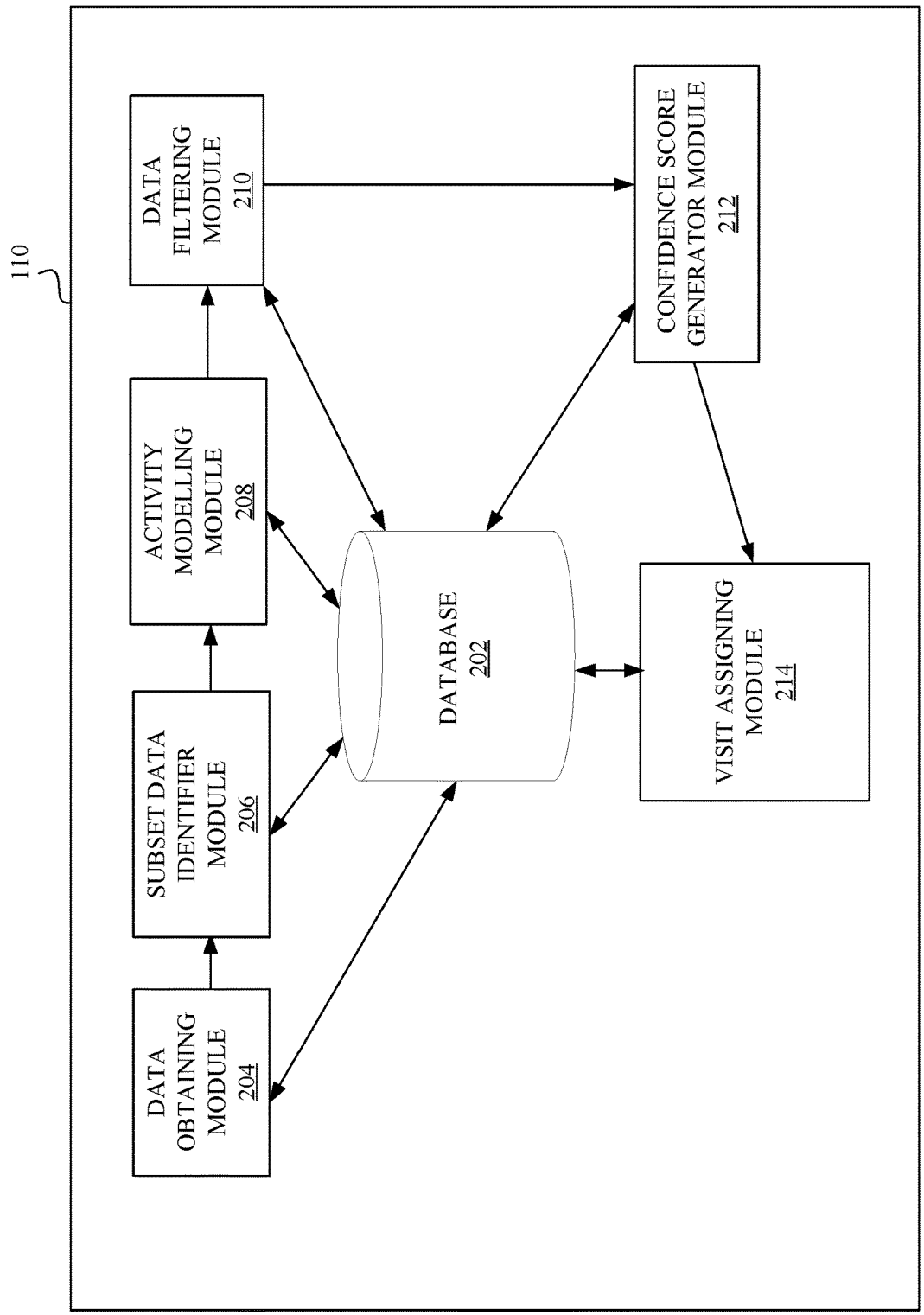
FIG. 2 is a block diagram of an adaptive visit assignment server of FIG. 1 according to some embodiments herein.

FIG. 2 is a block diagram of an adaptive visit assignment server 110 of FIG. 1 according to some embodiments herein. The adaptive visit assignment server 110 includes a database 202, a data obtaining module 204, a subset data identifier module 206, an activity modelling module 208, a data filtering module 210, a confidence score generator module 212, and a visit assigning module 214. The data obtaining module 204 obtains the plurality of data streams with at least one identifier from the one or more entity devices 104A-N over the network 108. The one or more entity devices 104A-N may be the independently controlled sources. The plurality of data streams includes a timestamp data and a location indexed data which partially characterizes the activity of the one or more entities 102A-N associated with the at least one identifier. In an embodiment, the at least one identifier associated with the plurality of data streams includes at least one of an advertisement identifier, a cookie identifier or a social media identifier. In some embodiments, the plurality of data streams are compared with a historical data stored in the database 202, where the historical data is associated with the at least one identifier to identify an inconsistency of the attributes associated with the one or more entities 102A-N on a periodic basis. For example, inconsistency is determined if a location data stream that is associated with a first entity in the historical data but is observed to be associated to a second entity in real-time.

The subset data identifier module 206 identifies a subset of the plurality of data streams that have the power-law characteristic in at least one of the time dimension or the spatial dimension from each of the plurality of data streams based on the power-law characteristic using clustering methods. A power-law characteristic is a functional relationship between a first and a second quantity, where a relative change in the first quantity results in a proportional relative change in the second quantity, independent of the initial size of the first quantity and the second quantity, the first quantity varies as a power of the second quantity. In some embodiments, the time dimension or spatial dimension are associated with the activity of the one or more entities 102A-N. In some embodiments, an approximation to a power-law includes a deviation term which may represent uncertainty in the observed values (perhaps measurement or sampling errors) or provide a simple way for observations to deviate from the power-law function. The subset data identifier module 206 may identify the subset of the plurality of data streams that have the power-law characteristic using a maximum-likelihood fitting method. The maximum-likelihood fitting method may be combined with a goodness-of-fit test based on a Kolmogorov-Smirnov (KS) statistic and likelihood ratios. The KS statistic is a nonparametric test of an equality of continuous, one-dimensional probability distributions that can be used to compare one or more samples with a reference probability distribution.

The activity modelling module 208 models the activity of the one or more entities 102A-N to determine the threshold for the region of uncertainty using the at least one identifier using Bayesian update models. The activity modelling module 208 may model the activity from the subset of the plurality of data streams that have the power-law characteristic to obtain one or more parametrized models. The one or more parametrized models may be used to determine the region of uncertainty. In some embodiments, the region of uncertainty is determined as the time range for the time dimension and as the geographical boundary for the spatial dimension. In some embodiments, the threshold for the region of uncertainty is changed to improve a quality of assigning the visit to the POI. The POI may include a geographic location such as a locality, a sub locality, an establishment, a geocode or an address.

The data filtering module 210 filters the plurality of data streams to obtain filtered activity when at least one of the time dimension and spatial dimension overlap in the region of uncertainty using the threshold. The data filtering module 210 may filter the plurality of data streams using k-means clustering or density based clustering. The at least one of the time dimension and spatial dimension overlap of the filtered activity may be clustered using a stay points clustering method to generate the at least one valid data stream. In some embodiments, one or more iterations are performed in filtering the plurality of data streams to obtain the at least one valid data stream. In some embodiments, the plurality of data streams are received from the one or more applications 106A-N that include time delays. In some embodiments, the plurality of data streams cause a conflict in the activity of the one or more entities 102A-N. In some embodiments, privacy compliance of the one or more applications 106A-N associated with the plurality of data streams is also validated.

In some embodiments, the data filtering module 210 cleanses the plurality of data streams obtained from the one or more entity devices 104A-N. The data filtering module 210 may filter or clean spurious, and fraudulent events, and correct errors of the inconsistency. In some embodiments, the plurality of data streams are validated and cleansed to ensure reasonable data is going for further processing of into the adaptive visit assignment system 100 for performing at least one of analysis, insights or profiling of an entity. Validated and cleansed data streams enable a scalable approach to process a high volume of incoming data streams in real-time. Some essential data filtering steps are to be carried out systematically for data refinement of the plurality of data streams. In some embodiments, each visit is modelled "probabilistically" with most plausible location in the region of uncertainty. A time series of events is also continually monitored for the power-law characteristics and only events that meet minimal modeling or sampling requirements are chosen for further downstream processing.

In some embodiments, the data filtering module 210 validates time points of the visit obtained from the plurality of data streams of an incoming traffic. In some embodiments, the plurality of data streams are analyzed based on a number of activities that one or more entities 102A-N can carry concurrently. The historical data associated with the one or more entities 102A-N is then bucketed based on a category of a time zone i.e. morning, daytime, afternoon, evening, nighttime, holiday, weekday or a weekend. In some embodiments, the historical data related with the one or more entities 102A-N can also be bucketed based on country wise time zones.

In some embodiments, the data filtering module 210 module then validates the time dimension based on a standardized country time zones of the one or more entities 102A-N. In some embodiments, each of the plurality of data streams is associated with attributes associated with the one or more entities 102A-N that includes, (i) an entity history, (ii) an entity visit history, (iii) time point or time-interval, (iv) a place of interest, (v) an application, (vi) a source of the application, and (vii) most recent locations. Each location data stream is given with a confidence score.

The confidence score generator module 212 generates the confidence score for the at least one valid data stream based on the plurality of contexts associated with the one or more entities 102A-N by comparing the at least one valid stream with the historical data associated with the one or more entities 102A-N. In some embodiments, the plurality of contexts includes a travel history context, a point of interest context, and a valid data stream source. In some embodiments, the travel history context includes the travel history of the one or more entities 102A-N. The point of interest context includes the point of interest of the one or more entities 102A-N.

The confidence score is generated based on the attributes associated with each location data stream. In some embodiments, a linear scoring model is used to generate the confidence score. In some embodiments, the linear scoring model uses a weightage assigned to the time of day, an entity and a location. In some embodiments, weights given to each location data stream are tuned periodically may be once a month after manual review and quality of inferences.

In some embodiments, the data filtering module 210 validates IP address of the one or more entity devices 104A-N from which the plurality of data streams are being generated. In some embodiments, the location of the one or more entities 102A-N is validated based on whether the one or more entities 102A-N is in a home country or a travel country and whether the one or more entities 102A-N is using a home network or a travel network. In some embodiments, each location data stream is validated based on their occurrence. For example, if the plurality of data streams lead to the visit of the one or more entities 102A-N to a country "X" and the next immediate plurality of data streams identifies visit of the one or more entities 102A-N in country "Y" across another continent which would physically be not valid. In such an instance, the data filtering module 210 module would treat the location data stream invalid.

In some embodiments, the data filtering module 210 validates IDFA (Identifier for Advertisers) or AAID (Android Advertising ID) based on the one or more entity devices 104A-N. In some embodiments, the data filtering module 210 module checks if the IDFA or AAID of the one or more entities 102A-N is in the database 202. Cookies received in the plurality of data streams of the one or more entities 102A-N are checked in the database 202 if the same has been come across in the past. If a cookie received is new or too old in the past, then it is stale. In some embodiments, if the received cookie history exists then the cookie is checked for the historical behaviors. For example, the one or more entities 102A-N are verified to be at same first night location where the night location may indicate a home location of the one or more entities 102A-N. In some embodiments, the data filtering module 210 even check a national range of IP's being generated by the one or more entities devices 104A-N to determine if the one or more entities devices 104A-N is spanning the country or spanning a globe.

In some embodiments, the data filtering module 210 checks if the at least one identifier is a part of a do not profile list which constrains it from creating a profile due to its privacy management system. In some embodiments, the at least one identifier are validated across multiple sources of the plurality of data streams to check if the behavior of the one or more entities 102A-N is consistent. For example, location tags for the same identifier from two independent data stream sources need to be near or close to each other in a reasonable manner. In some embodiments, the plurality of data streams are compared with a history associated with the at least one identifier to identify anomaly on a periodic basis. The confidence score generator module 212 generates a confidence score for the at least one valid data stream based on a plurality of contexts associated with the plurality of entities using a linear scoring model, the plurality of contexts includes a travel history of the plurality of entities, a set of point of interest of the plurality of entities and a source of the at least one valid stream.

In some embodiments, the confidence score generator module 212 smoothens a burst of the plurality of data streams if any, from the one or more entity devices 104A-N that generates the plurality of data streams. Depending on a source, the one or more entity devices 104A-N may produce a burst of pings in a very short interval of time. For example, when the one or more entities 102A-N log in a web browser page, the web browser page may trigger multiple events or prompts. The burst of pings may even occur due to an underlying hardware system or because of an intermediary noise in the pipelines. In some embodiments, the plurality of data streams having unnatural behaviors are filtered and cleansed to a reasonable extent before they are routed to the pipelines.

In some embodiments, the cleansing steps can be applied in streaming and batch modes to each event or time point from the one or more entity devices 104A-N where the cleansing can happen in a single pass or in multiple passes. In some embodiments, the multiple pass cleansing happens when there is a delay in receiving the plurality of data streams from the one or more entity devices 104A-N or the plurality of data streams from multiple sources for the one or more entities 102A-N. An output from the multiple pass cleansing is propagated to the subset identifier module 206.

The visit assigning module 214 assigns the visit of the one or more entities 102A-N to the point of interest (POI) based on the confidence score of the at least one valid data stream. In some embodiments, the confidence score generator module 212 combines the plurality of data streams with a physical or geo-spatial model of the world and aggregates characteristics of the one or more entities 102A-N to power multiple inferences including assigning plausible POIs to an event (each event belongs to an individual entity, for example, a consumer). A plurality of POI assignments are plausible for the event based on the end use-case which includes (a) place profiling, (b) user history building, (c) offline attribution and (d) geo marketing (including geo-fencing). Inferences form a visit assignment model are periodically triangulated with real world long run observations for each of the use cases. For example, in case of place profiling, average behavior of places might be taken into consideration.

Figure 3A:
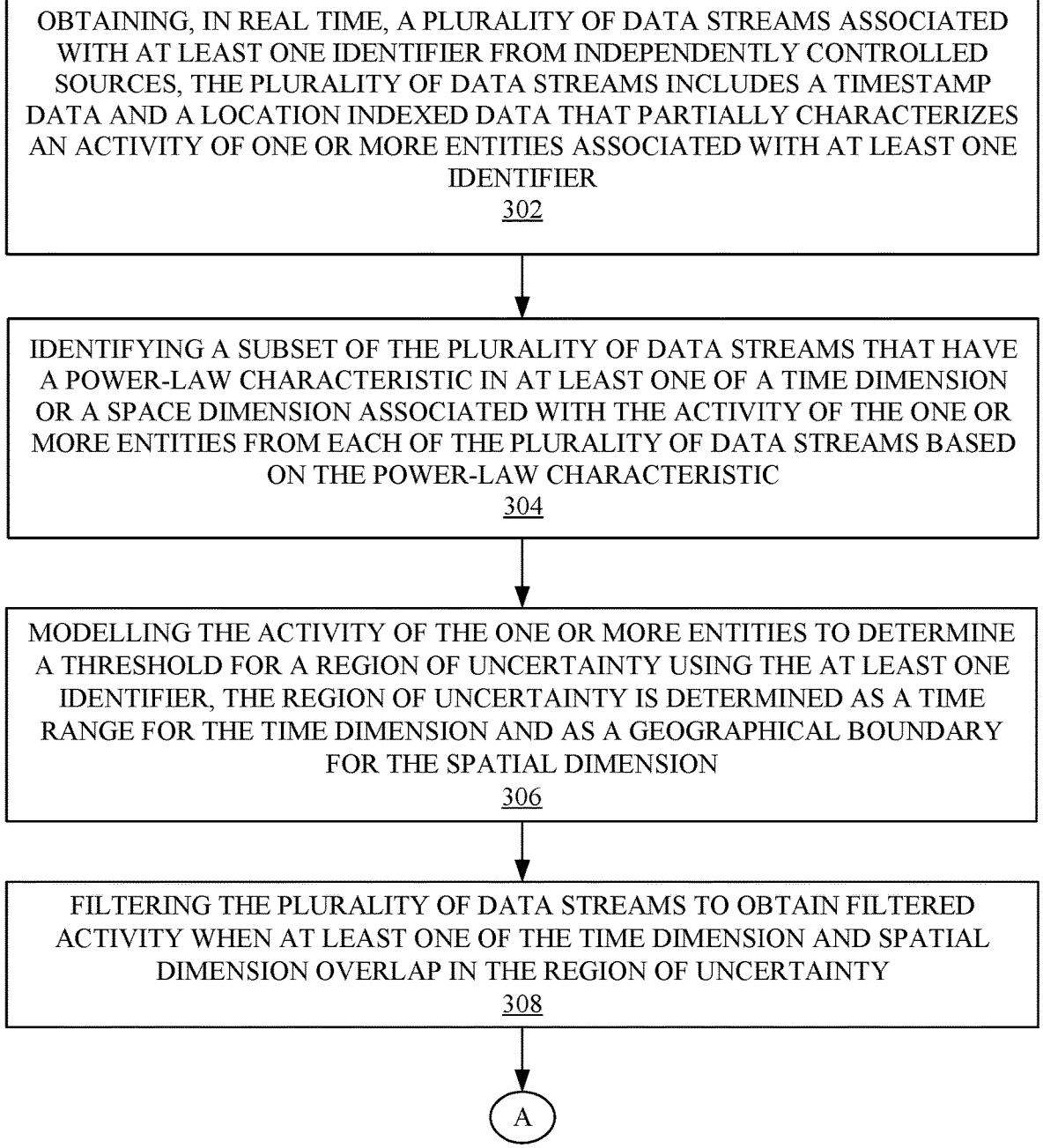
FIGS. 3A and 3B are flow diagrams of a method for automatically assigning visits to location data streams to maintain a geo-spatial model in a real world according to some embodiments herein.
Figure 3B:
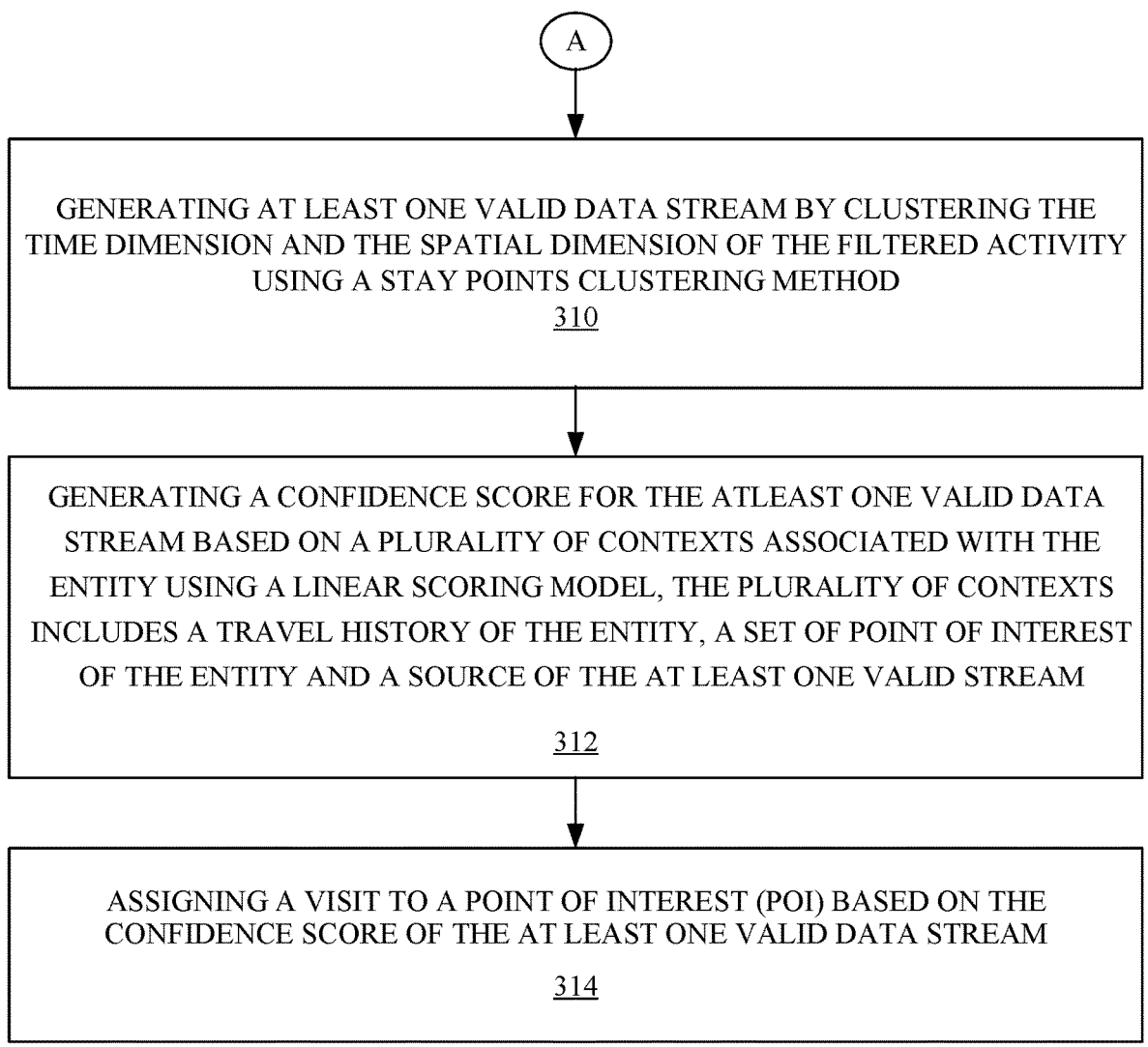

With reference to FIG. 1, FIGS. 3A and 3B are flow diagrams of a method for automatically assigning visits to partially observable location data streams to maintain a geo-spatial model in a real world according to some embodiments herein. At a step 302, the plurality of data streams associated with at least one identifier, in real time, is obtained from independently controlled sources. The plurality of streams include the timestamp data and the location indexed data that partially characterizes the activity of the one or more entities 102A-N associated with the at least one identifier. At a step 304, the subset of the plurality of data streams that have the power-law characteristic in at least one of the time dimension or the space dimension associated with the activity of the one or more entities 102A-N is identified from each of the plurality of data streams based on the power-law characteristic. At a step 306, the activity of the one or more entities 102A-N is modelled to determine the threshold for the region of uncertainty using the at least one identifier. The region of uncertainty is determined as the time range for the time dimension and as the geographical boundary for the spatial dimension. At a step 308, the plurality of data streams is filtered to obtain the filtered activity when at least one of the time dimension and spatial dimension overlap in the region of uncertainty. At a step 310, the time dimension and spatial dimension of the filtered activity is clustered using the stay points clustering method to generate at least one valid data stream. At a step 312, the confidence score for the at least one valid data stream is generated based on the plurality of contexts associated with the one or more entities 102A-N using a linear scoring model. The plurality of contexts includes the travel history of the one or more entities 102A-N, the set of point of interest of the one or more entities 102A-N and the source of the at least one valid stream. At a step 314, the visit is assigned to the point of interest (POI) based on the confidence score of the at least one valid data stream.

Figure 4:
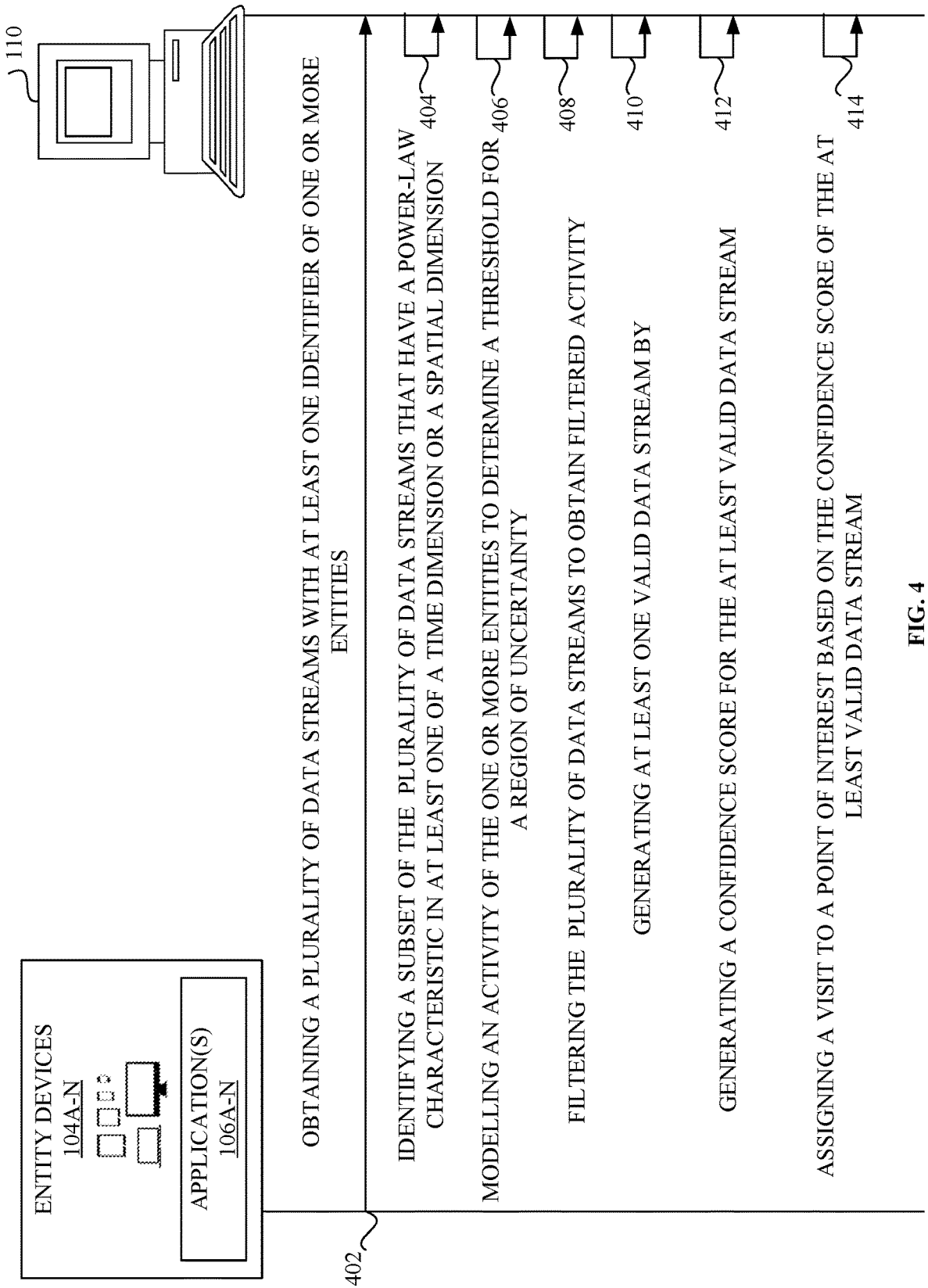
FIG. 4 illustrates an interaction diagram of a method for automatically assigning visits to location data streams to maintain a geo-spatial model in a real world according to some embodiments herein.

With reference to FIG. 1, FIG. 4 illustrates an interaction diagram of a method for automatically assigning visits to location data streams according to some embodiments herein. At a step 402, the plurality of data streams associated with the at least one identifier, in real time, is obtained from the independently controlled sources. The plurality of data streams includes the timestamp data and the location indexed data that partially characterizes the activity of the one or more entities 102A-N associated with the at least one identifier. At a step 404, the subset of the plurality of data streams that have the power-law characteristic in at least one of the time dimension or the space dimension associated with the activity of the one or more entities 102A-N is identified from each of the plurality of data streams based on the power-law characteristic. At a step 406, the activity of the one or more entities 102A-N is modelled to determine the threshold for the region of uncertainty using the at least one identifier. The region of uncertainty is determined as the time range for the time dimension and as the geographical boundary for the spatial dimension. At a step 408, the plurality of data streams is filtered to obtain the filtered activity when at least one of the time dimension and spatial dimension overlap in the region of uncertainty. At a step 410, the time dimension and spatial dimension of the filtered activity is clustered using a stay points clustering method to generate the at least one valid data stream. At a step 412, the confidence score for the at least one valid data stream is generated based on the plurality of contexts associated with the one or more entities 102A-N using the linear scoring model. The plurality of contexts includes the travel history of the one or more entities 102A-N, the set of point of interest of the one or more entities 102A-N and the source of the at least one valid stream. At a step 414, the visit is assigned to the point of interest (POI) based on the confidence score of the at least one valid data stream.

Figure 5:
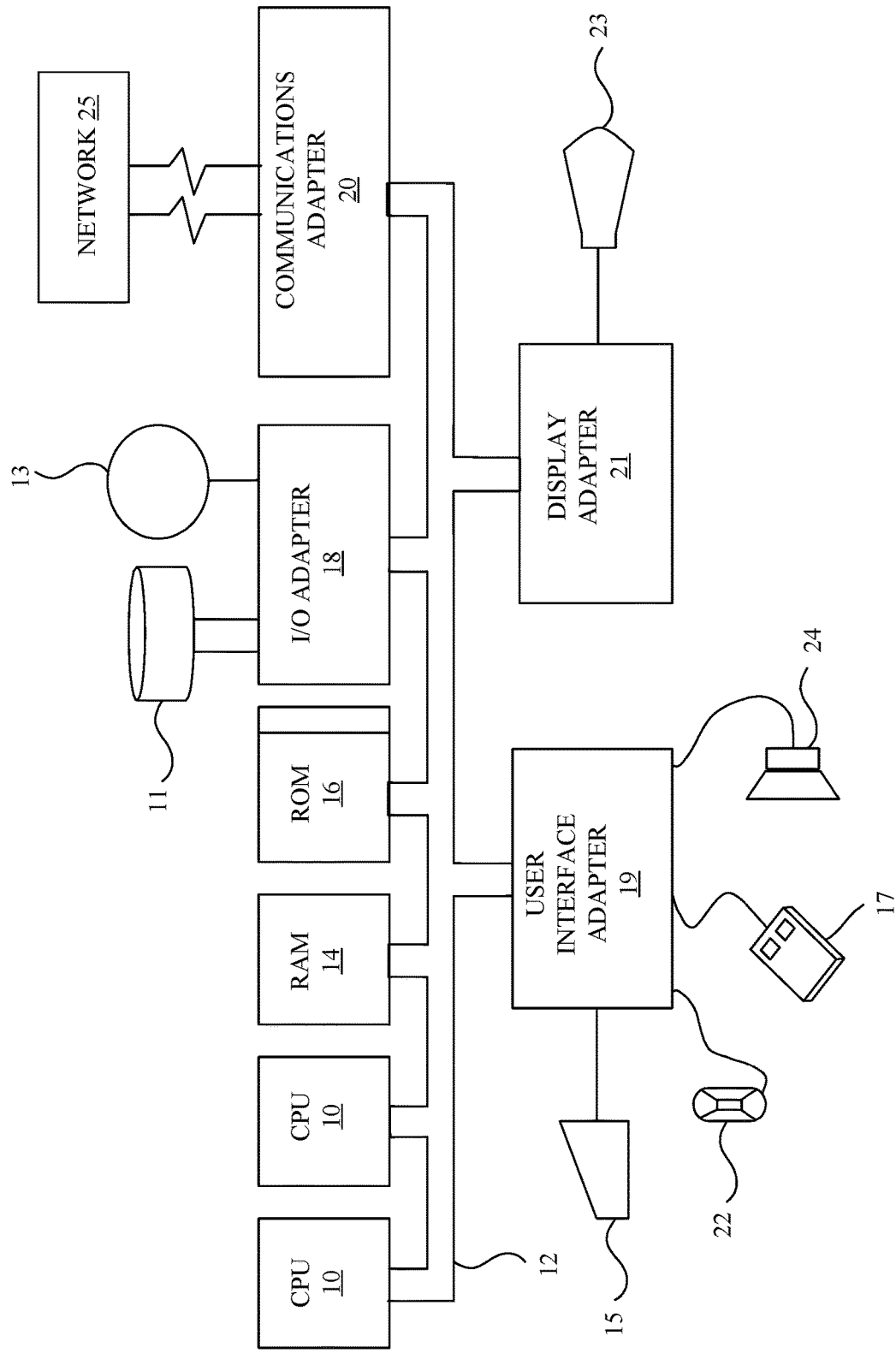
FIG. 5 is a schematic diagram of a computer architecture of an adaptive visit assignment server or one or more entity devices in accordance with embodiments herein.

A representative hardware environment for practicing the embodiments herein is depicted in FIG. 5, with reference to FIGS. 1 through 4. This schematic drawing illustrates a hardware configuration of a server or a computer system or a computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A method for automatically assigning a visit to partially observable location data streams, wherein the method comprises:
    obtaining, in real time, a plurality of data streams with at least one identifier from independently controlled sources, wherein the plurality of data streams comprises a timestamp data and a location indexed data that partially characterizes an activity of a plurality of entities associated with the at least one identifier;
    identifying a subset of the plurality of data streams that have a power-law characteristic in at least one of a time dimension or a spatial dimension associated with the activity of the plurality of entities from each of the plurality of data streams based on the power-law characteristic;
    modelling the activity of the plurality of entities to determine a threshold for a region of uncertainty using the at least one identifier, wherein the region of uncertainty is determined as a time range for the time dimension and as a geographical boundary for the spatial dimension;

filtering the plurality of data streams to obtain a filtered activity of the plurality of entities when either the time dimension and the spatial dimension overlap in the region of uncertainty using the threshold;

validating the plurality of data streams by comparing at least one of an advertisement identifier, a cookie identifier and a social media identifier with previously observed identifiers;

generating at least one valid data stream by clustering the time dimension and the spatial dimension of the filtered activity using a stay points clustering method;

generating a confidence score for the at least one valid data stream based on a plurality of contexts associated with the plurality of entities using a linear scoring model, wherein the plurality of contexts includes a travel history of the plurality of entities, a set of point of interest of the plurality of entities and a source of the at least one valid stream; and assigning a visit of the plurality of entities to a point of interest (POI) based on the confidence score of the at least one valid data stream.

2. The method of claim 1, wherein the visit of the plurality of entities to the POI is used to perform at least one of a POI profiling, generating an entity visit history, offline attribution, or, geo-fencing.

3. The method of claim 2, wherein the method further comprises validating the entity visit history that comprises a plurality of visits by updating the plurality of visits upon determining a new visit of the plurality of entities to the POI is observed using the at least one valid data stream.

4. The method of claim 1, wherein the method further comprises improving a quality of assigning the visit to the POI by changing the threshold for the region of uncertainty.

5. The method of claim 1, wherein the method further comprises validating the plurality of data streams based on a privacy compliance of an application associated with the plurality of data streams.

6. The method of claim 3, wherein the method further comprises identifying an anomaly in the entity visit history on a periodic basis by validating the plurality of data streams with a historical data associated with the at least one identifier associated with the plurality of entities.

7. The method of claim 6, wherein the method further comprises performing a plurality of iterations for filtering the plurality of data streams to generate the at least one valid data stream, wherein the plurality of iterations is performed either when the plurality of data streams is obtained after a predetermined time delay or the plurality of data streams signal a conflict of the visit in the entity visit history.

8. The method of claim 1, wherein generating the confidence score further comprises assigning a weight to at least one of a time of the activity, an entity associated with the activity or a location of the activity.

9. A system for automatically assigning a visit to partially observable location data streams, said system comprising:

a processor; and a memory that stores a set of instructions, which when executed by the processor, causes to perform:

obtaining, in real time, a plurality of data streams with at least one identifier from independently controlled sources, wherein the plurality of data streams comprises a timestamp data and a location indexed data that partially characterizes an activity of a plurality of entities associated with the at least one identifier;

identifying a subset of the plurality of data streams that have a power-law characteristic in at least one of a time dimension or a spatial dimension associated with the activity of the plurality of entities from each of the plurality of data streams based on the power-law characteristic;

modelling the activity of the plurality of entities to determine a threshold for a region of uncertainty using the at least one identifier, wherein the region of uncertainty is determined as a time range for the time dimension and as a geographical boundary for the spatial dimension;

filtering the plurality of data streams to obtain a filtered activity of the plurality of entities when either the time dimension and the spatial dimension overlap in the region of uncertainty using the threshold;

validating the plurality of data streams by comparing at least one of an advertisement identifier, a cookie identifier and a social media identifier with previously observed identifiers;

generating at least one valid data stream by clustering the time dimension and the spatial dimension of the filtered activity using a stay points clustering method;

generating a confidence score for the at least one valid data stream based on a plurality of contexts associated with the plurality of entities using a linear scoring model, wherein the plurality of contexts includes a travel history of the plurality of entities, a set of point of interest of the plurality of entities and a source of the at least one valid stream; and assigning a visit of the plurality of entities to a point of interest (POI) based on the confidence score of the at least one valid data stream.

10. The system of claim 9, wherein the visit of the plurality of entities to the POI is used to perform at least one of a POI profiling, generating an entity visit history, offline attribution, or, geo-fencing.

11. The system of claim 10, wherein the processor further validates the entity visit history that comprises a plurality of visits by updating the plurality of visits upon determining a new visit of the plurality of entities to the POI is observed using the at least one valid data stream.

12. The system of claim 9, wherein the processor further improves a quality of assigning the visit to the POI by changing the threshold for the region of uncertainty.

13. The system of claim 9, wherein the processor further validates the plurality of data streams based on a privacy compliance of an application associated with the plurality of data streams.

14. The system of claim 11, wherein the processor further identifies an anomaly in the entity visit history on a periodic basis by validating the plurality of data streams with a historical data associated with the at least one identifier associated with the plurality of entities.

15. The system of claim 14, wherein the processor further performs a plurality of iterations for filtering the plurality of data streams to generate the at least one valid data stream, wherein the plurality of iterations is performed either when the plurality of data streams is obtained after a predetermined time delay or the plurality of data streams signal a conflict of the visit in the entity visit history.

16. The system of claim 9, wherein generating the confidence score further comprises assigning a weight to at least one of a time of the activity, an entity associated with the activity or a location of the activity.

17. A one or more non-transitory computer-readable storage mediums storing the one or more sequences of instructions, which when executed by the one or more processors, causes to perform a method for automatically assigning visits to partially observable location data streams, wherein the method comprises:
- obtaining, in real time, a plurality of data streams with at least one identifier from independently controlled sources, wherein the plurality of data streams comprises a timestamp data and a location indexed data that partially characterizes an activity of a plurality of entities associated with the at least one identifier;
- identifying a subset of the plurality of data streams that have a power-law characteristic in at least one of a time dimension or a spatial dimension associated with the activity of the plurality of entities from each of the plurality of data streams based on the power-law characteristic;
- modelling the activity of the plurality of entities to determine a threshold for a region of uncertainty using the at least one identifier, wherein the region of uncertainty is determined as a time range for the time dimension and as a geographical boundary for the spatial dimension;
- filtering the plurality of data streams to obtain a filtered activity of the plurality of entities when either the time dimension and the spatial dimension overlap in the region of uncertainty using the threshold;
- validating the plurality of data streams by comparing at least one of an advertisement identifier, a cookie identifier and a social media identifier with previously observed identifiers;
- generating at least one valid data stream by clustering the time dimension and the spatial dimension of the filtered activity using a stay points clustering method;
- generating a confidence score for the at least one valid data stream based on a plurality of contexts associated with the plurality of entities using a linear scoring model, wherein the plurality of contexts includes a travel history of the plurality of entities, a set of point of interest of the plurality of entities and a source of the at least one valid stream; and
- assigning a visit of the plurality of entities to a point of interest (POI) based on the confidence score of the at least one valid data stream.

* * * * *